United States Patent
Huang et al.

(10) Patent No.: US 11,603,458 B2
(45) Date of Patent: Mar. 14, 2023

(54) BLACK RESIN COMPOSITION, CURED FILM, AND BLACK FILTER

(71) Applicant: eChem Solutions Corp., Taoyuan (TW)

(72) Inventors: Chin-Chen Huang, Taoyuan (TW); Yu-Wen Chen, Taoyuan (TW); Yu-Lun Li, Taoyuan (TW); Chen-Wen Chiu, Taoyuan (TW)

(73) Assignee: eChem Solutions Corp., Taoyuan (TW)

( * ) Notice: Subject to any disclaimer, the term of this patent is extended or adjusted under 35 U.S.C. 154(b) by 79 days.

(21) Appl. No.: 17/412,286

(22) Filed: Aug. 26, 2021

(65) Prior Publication Data

US 2022/0098398 A1    Mar. 31, 2022

(30) Foreign Application Priority Data

Sep. 29, 2020 (TW) ................. 109133818

(51) Int. Cl.
    *C08L 35/02* (2006.01)
    *C08J 5/18* (2006.01)
    *G02B 1/04* (2006.01)
    *G02B 5/00* (2006.01)

(52) U.S. Cl.
    CPC ............. *C08L 35/02* (2013.01); *C08J 5/18* (2013.01); *G02B 1/04* (2013.01); *G02B 5/003* (2013.01); *C08J 2335/02* (2013.01); *C08J 2435/02* (2013.01); *C08L 2205/025* (2013.01); *C09K 2323/035* (2020.08)

(58) Field of Classification Search
    CPC ....... C08L 35/02; C08L 2205/025; C08J 5/18; C08J 2335/02; C08J 2435/02; G02B 1/04; G02B 5/003
    See application file for complete search history.

(56) References Cited

U.S. PATENT DOCUMENTS

| | | | | |
|---|---|---|---|---|
| 2010/0062377 A1* | 3/2010 | Kim | ........... | G02B 5/201 359/885 |
| 2011/0151379 A1* | 6/2011 | Choi | ........... | G03F 7/032 430/270.1 |
| 2016/0377765 A1* | 12/2016 | Kang | ........... | G02B 1/04 430/286.1 |

FOREIGN PATENT DOCUMENTS

| | | |
|---|---|---|
| JP | 2010160418 | 7/2010 |
| JP | 2013114184 | 6/2013 |
| TW | I575314 | 3/2017 |
| TW | 201802595 | 1/2018 |
| TW | I659265 | 5/2019 |
| TW | I681254 | 1/2020 |
| TW | I683184 | 1/2020 |

OTHER PUBLICATIONS

"Office Action of Taiwan Counterpart Application", dated May 17, 2022, p. 1-p. 6.

* cited by examiner

*Primary Examiner* — Bijan Ahvazi
(74) *Attorney, Agent, or Firm* — JCIPRNET

(57) ABSTRACT

A black resin composition, a cured film, and a black filter are provided. The black resin composition includes: a black coloring agent (A), an ethylenically-unsaturated monomer (B), a solvent (C), a resin (D), a photoinitiator (E), a UV absorber (F), and a surfactant (G). The resin (D) includes a first resin having a weight-average molecular weight of 2,000 to 20,000. The first resin includes a structural unit having a fluorene ring and two or more ethylenically-polymerizable groups. The UV absorber (F) includes a benzylidene-based derivative.

7 Claims, No Drawings

BLACK RESIN COMPOSITION, CURED FILM, AND BLACK FILTER

CROSS-REFERENCE TO RELATED APPLICATION

This application claims the priority benefit of Taiwan application serial no. 109133818, filed on Sep. 29, 2020. The entirety of the above-mentioned patent application is hereby incorporated by reference herein and made a part of this specification.

BACKGROUND OF THE INVENTION

Field of the Invention

The invention relates to a resin composition, a cured film, and a filter, and particularly relates to a black resin composition, a cured film, and a black filter.

Description of Related Art

Light emitted by a liquid crystal display device shows a certain frequency and periodic change with time, and is also changed with time under different brightness and color. If the driver of the light source does not have a suitable electronic circuit (such as a ballast, a driver, or a power supply), the light emitted by the light source produces stroboscopic phenomenon (i.e., flicker phenomenon). Moreover, the greater the fluctuation of the output luminous flux, the more serious the stroboscopic phenomenon. The working current of the light source inevitably fluctuates with the fluctuation of the input voltage, thus directly causing stroboscopic phenomenon due to the fluctuation of the light output. In particular, when the light source is operated at high brightness, a more serious stroboscopic phenomenon may occur, so that a complementary metal-oxide semiconductor (CMOS) image sensor element is unable to operate normally.

Generally, a black filter is used in the liquid crystal display device to reduce the amount of light penetration in the visible light region so as to achieve the regulation of the saturation time of the CMOS image sensor element, to alleviate stroboscopic phenomenon. However, the currently used resin composition and the black filter made thereby may not have good resolution, developability, and adhesion at the same time.

SUMMARY OF THE INVENTION

Accordingly, the invention provides a black resin composition, a cured film, and a black filter having good resolution, developability, and adhesion at the same time, and having a suitable light transmittance under a certain thickness.

The invention provides a black resin composition including: a black coloring agent (A), an ethylenically-unsaturated monomer (B), a solvent (C), a resin (D), a photoinitiator (E), a UV absorber (F), and a surfactant (G). The resin (D) includes a first resin having a weight-average molecular weight of 2,000 to 20,000. The first resin includes a structural unit having a fluorene ring and two or more ethylenically-polymerizable groups. The UV absorber (F) includes a benzylidene-based derivative.

In an embodiment of the invention, the structural unit having the fluorene ring and the two or more ethylenically-polymerizable groups is a structural unit represented by the following formula (1):

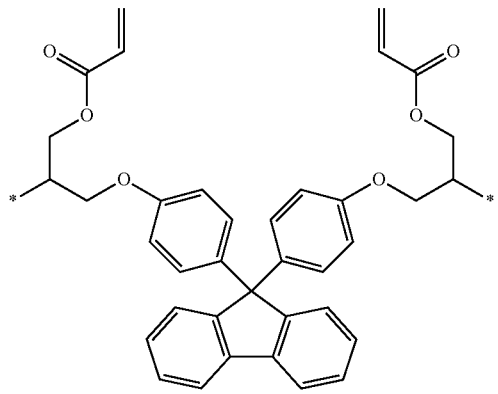

formula (1)

In formula (1), * represents a bonding position.

In an embodiment of the invention, the black coloring agent (A) includes a carbon black (A-1) and a titanium black (A-2), and a particle size of the carbon black (A-1) and the titanium black (A-2) is less than 80 nm.

In an embodiment of the invention, the ethylenically-unsaturated monomer (B) is a monomer having four or more (meth)acryloyl groups.

In an embodiment of the invention, the solvent (C) includes a propylene glycol-based ether solvent (C-1), and the propylene glycol-based ether solvent (C-1) is at least one selected from a group consisting of propylene glycol monomethyl ether, propylene glycol monomethyl ether acetate, dipropylene glycol monomethyl ether acetate, propylene glycol monoethyl ether, and propylene glycol monopropyl ether.

In an embodiment of the invention, the photoinitiator (E) includes an oxime ester-based photoinitiator.

In an embodiment of the invention, based on 100 parts by weight of the ethylenically-unsaturated monomer (B), the oxime ester-based photoinitiator is 1 part by weight to 50 parts by weight.

In an embodiment of the invention, based on 100 parts by weight of the ethylenically-unsaturated monomer (B), the benzylidene derivative is 1.28 parts by weight to 2.35 parts by weight.

In an embodiment of the invention, the surfactant (G) includes at least one selected from a group consisting of a fluorine surfactant (G-1), a siloxane surfactant (G-2), and a nonionic surfactant (G-3).

The invention provides a cured film formed by the black resin composition above, and the cured film has a visible light transmittance of 5% to 50% when a thickness thereof is 0.2 μm.

The invention provides a black filter formed by the black resin composition above, and the black filter has a visible light transmittance of 5% to 50% when a thickness thereof is 0.2 μm.

Based on the above, the black resin composition of the invention includes a specific resin and a specific UV absorber. Accordingly, when the black resin composition is used to form a cured film or a black filter, the cured film or the black filter may have good resolution, developability, and adhesion, and also has a suitable light transmittance under a certain thickness, thereby alleviating the phenomena of excessive development residue, pattern line edge defect, and poor adhesion.

DESCRIPTION OF THE EMBODIMENTS

<Black Resin Composition>

The present embodiment provides a black resin composition, including a black coloring agent (A), an ethylenically-unsaturated monomer (B), a solvent (C), a resin (D), a photoinitiator (E), a UV absorber (F), and a surfactant (G). Moreover, the black resin composition may further include other additives (H) if needed. In the following, the individual components used in the black resin composition are described in detail.

It should be mentioned that, the visible light transmittance of the cured film or the black filter formed by the black resin composition of the present embodiment is 5% to 50% when the thickness thereof is 0.2 μm. Therefore, when the cured film or the black filter is applied in a display device, the amount of light penetration in the visible light region may be effectively reduced, so as to regulate the saturation time of a CMOS image sensor element to alleviate stroboscopic phenomenon.

In the present specification, 'visible light transmittance' refers to the transmittance at a wavelength of 380 nm to 780 nm.

In the present specification, '(meth)acrylic acid' represents 'acrylic acid' and/or 'methacrylic acid', '(meth)acrylate' represents 'acrylate' and/or 'methacrylate', '(meth) acryloyl group' represents 'acryloyl group' and/or 'methacryloyl group', and '(meth)acrylamide' represents 'acrylamide' and/or 'methacrylamide'.

Black Coloring Agent (A)

The black coloring agent (A) includes a titanium black (A-1) and a carbon black (A-2). Moreover, the present embodiment is not limited thereto, and the black coloring agent (A) may also include an organic black pigment (for example, lactam-based organic black, RGB black, RVB black, etc.), an inorganic black pigment (for example, aniline black, perylene black, cyanine black, lignin black, etc.), a combination of the above black pigments, or other suitable black coloring agents.

The particle size of the titanium black (A-1) and the particle size of the carbon black (A-2) are not particularly limited, and a suitable particle size may be selected as needed, and preferably is less than 80 nm. When the particle sizes of the titanium black (A-1) and the carbon black (A-2) are less than 80 nm, the cured film and the black filter formed by the black resin composition may have better resolution.

Based on 100 parts by weight of the ethylenically-unsaturated monomer (B), the black coloring agent (A) is 500 parts by weight to 1500 parts by weight, preferably 500 parts by weight to 900 parts by weight.

Ethylenically-Unsaturated Monomer (B)

The ethylenically-unsaturated monomer (B) may be a monomer having four or more (meth)acryloyl groups, and is preferably a monomer having six or more (meth)acryloyl groups. When the ethylenically-unsaturated monomer (B) is a monomer having four or more (meth)acryloyl groups, the cured film and the black filter formed by the black resin composition may have better resolution and adhesion.

Specifically, specific examples of the ethylenically-unsaturated monomer (B) may include dipentaerythritol hexaacrylate (DPHA), polyfunctional polyurethane acrylate (trade name: DPHA-40H, manufactured by Nippon Kayaku Co., Ltd.), ethylene glycol di(meth)acrylate, diethylene glycol di(meth)acrylate, tetraethylene glycol di(meth)acrylate, propylene glycol di(meth)acrylate, polypropylene glycol di(meth)acrylate, butanediol di(meth)acrylate, neopentyl glycol di(meth)acrylate, 1,6-hexanediol di(meth)acrylate, trimethylolpropane tri(meth)acrylate, glycerol di(meth)acrylate, pentaerythritol triacrylate, pentaerythritol tetraacrylate, dipentaerythritol pentaacrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, 2,2-bis(4-(meth)acryloxydiethoxyphenyl)propane, 2,2-bis(4-(meth)acryloxypolyethoxyphenyl)propane, 2-hydroxy-3-(meth)acryloxypropyl (meth)acrylate, ethylene glycol diglycidyl ether di(meth)acrylate, diethylene glycol diglycidyl ether di(meth)acrylate, diglycidyl phthalate di(meth)acrylate, glycerol triacrylate, glycerol polyglycidyl ether poly(meth)acrylate, urethane (meth)acrylate, a reactant of trimethylhexamethylene diisocyanate, hexamethylene diisocyanate, and 2-hydroxyethyl (meth)acrylate, N,N'-methylenebis (meth)acrylamide, (meth)acrylamide methylene ether, a condensate of polyol and N-hydroxymethyl (meth)acrylamide, triacryl formal, 9,9-bis[4-(3-propenyloxy-2-hydroxypropoxy)phenyl]fluorene, 9,9-bis[3-methyl-4-(3-propenyloxy-2-hydroxypropoxy)phenyl]fluorene, 9,9-bis[3-chloro-4-(3-propenyloxy-2-hydroxypropoxy)phenyl]fluorene, bisphenoxyethanol fluorene diacrylate, diphenoxyethanol fluorene dimethacrylate, biscresol fluorene diacrylate, biscresol fluorene dimethacrylate, or a combination thereof. Specific examples of the ethylenically-unsaturated monomer (B) preferably include dipentaerythritol hexaacrylate and polyfunctional polyurethane acrylate (trade name: DPHA-40H, manufactured by Nippon Kayaku Co., Ltd.), or a combination thereof. The ethylenically-unsaturated monomer (B) may be used alone or in combination.

Solvent (C)

The solvent (C) is not particularly limited, and a suitable solvent may be selected as needed. Specifically, the solvent (C) includes a propylene glycol-based ether solvent (C-1). In addition, the solvent (C) may further include a glycol ether solvent (C-2).

The propylene glycol-based ether solvent (C-1) is at least one selected from a group consisting of propylene glycol monomethyl ether, propylene glycol monomethyl ether acetate, dipropylene glycol monomethyl ether acetate, propylene glycol monoethyl ether, and propylene glycol monopropyl ether.

Specific examples of the glycol ether solvent (C-2) include diethylene glycol monomethyl ether, diethylene glycol monoethyl ether, diethylene glycol monobutyl ether, diethylene glycol monomethyl ether acetate, diethylene glycol monoethyl ether acetate, or a combination thereof.

The solvent (C) may be used alone or in combination.

Based on 100 parts by weight of the ethylenically-unsaturated monomer (B), the propylene glycol-based ether solvent (C-1) is 500 parts by weight to 1500 parts by weight, preferably 600 parts by weight to 1200 parts by weight, and more preferably 700 parts by weight to 1160 parts by weight.

Based on 100 parts by weight of the ethylenically-unsaturated monomer (B), the solvent (C) is 500 parts by weight to 1500 parts by weight, preferably 800 parts by weight to 1400 parts by weight.

Resin (D)

The resin (D) includes a first resin. The first resin includes a structural unit having a fluorene ring and two or more ethylenically-polymerizable groups. The weight-average molecular weight of the first resin is 2,000 to 20,000, preferably 3,000 to 7,000, and more preferably 4,500 to 5,000.

Specifically, the structural unit having the fluorene ring and the two or more ethylenically-polymerizable groups is preferably a structural unit represented by the following formula (1):

formula (1)

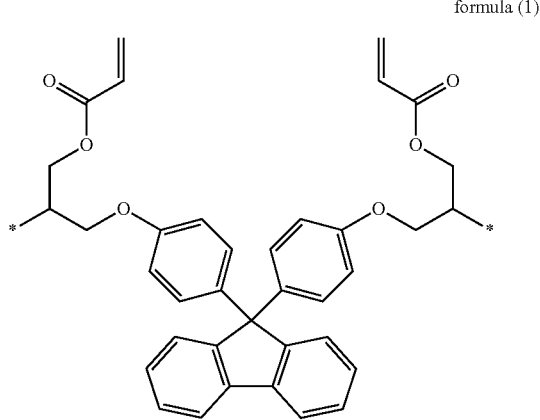 [SMILES: *C(COC(=O)C=C)COc1ccc(C2(c3ccc(OCC(*)COC(=O)C=C)cc3)c3ccccc3-c3ccccc32)cc1]

In formula (1), * represents a bonding position.

Moreover, preferred specific examples of the structural unit represented by formula (1) include a monomer represented by the following formula (1-1).

formula (1-1)

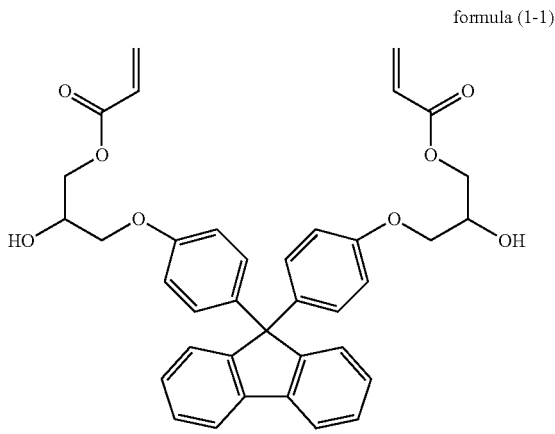 [SMILES: C=CC(=O)OCC(O)COc1ccc(C2(c3ccc(OCC(O)COC(=O)C=C)cc3)c3ccccc3-c3ccccc32)cc1]

The first resin is a cardo resin formed by polymerizing a monomer having a fluorene ring and two or more ethylenically-polymerizable groups, tetracarboxylic dianhydride, and dicarboxylic acid. Tetracarboxylic dianhydride and dicarboxylic acid are not particularly limited, and suitable tetracarboxylic dianhydride and dicarboxylic acid may be selected as needed.

Moreover, the method of synthesizing the first resin is also not particularly limited, and a monomer having a fluorene ring and two or more ethylenically-polymerizable groups, tetracarboxylic dianhydride, and dicarboxylic acid may be polymerized into a structural unit having a fluorene ring and two or more ethylenically-polymerizable groups using a conventional organic synthesis method.

Specific examples of the first resin include a cardo resin (trade name KBR series, KISCO Ltd.)

Based on 100 parts by weight of the ethylenically-unsaturated monomer (B), the first resin is 50 parts by weight to 300 parts by weight, preferably 100 parts by weight to 250 parts by weight.

When the first resin is included in the black resin composition, the cured film and the black filter formed by the black resin composition may have good resolution and developability. When the first resin is not included in the black resin composition, the resolution and developability of the cured film and the black filter formed by the black resin composition are poor. In addition, when the content of the first resin included in the black resin composition is within the above range, the cured film and the black filter formed by the black resin composition may have better resolution and developability.

In addition, when the content of the oxime ester-based photoinitiator contained in the black resin composition falls within the above range, the cured film and the black filter formed by the black resin composition may have better resolution.

In addition, the present embodiment is not limited thereto, and the resin (D) may further include other resins other than the first resin.

Photoinitiator (E)

The photoinitiator (E) may include an oxime ester-based photoinitiator. Moreover, the present embodiment is not limited thereto, and the photoinitiator (E) may include other suitable photoinitiators.

The oxime ester-based photoinitiator is not particularly limited, and a suitable oxime ester-based photoinitiator may be selected as needed. Specifically, specific examples of the oxime ester-based photoinitiator (E-1) include Photocure 4456 (manufactured by Eutec), Irgacure OXE-01, OXE-02, OXE-03, OXE-04 (trade names; manufactured by BASF), or other suitable oxime ester-based photoinitiators. The oxime ester-based photoinitiator may be used alone or in combination.

Based on 100 parts by weight of the ethylenically-unsaturated monomer (B), the oxime ester-based photoinitiator is 1 part by weight to 50 parts by weight, preferably 5 parts by weight to 15 parts by weight.

When the photoinitiator (E) in the black resin composition includes an oxime ester-based photoinitiator, the cured film and the black filter formed by the black resin composition may have better resolution. In addition, when the content of the oxime ester-based photoinitiator contained in the black resin composition falls within the above range, the cured film and the black filter formed by the black resin composition may have better resolution.

UV Absorber (F)

The UV absorber (F) includes a benzylidene-based derivative.

Specifically, the benzylidene-based derivative has a compound of a benzylidene group represented by the following formula (2).

formula (2)

In formula (2), * represents a bonding position.

Specific examples of the benzylidene-based derivative include 4-methylbenzylidene camphor, 1,7,7-trimethyl-3-(phenylmethylene)bicyclo[2.2.1]heptan-2-one, benzylidene camphor sulfonic acid, polypropylene amide methyl benzylidene camphor, (4-((3-(2H-benzo[d][ 1,2,3]triazol-2-yl)-2-hydroxy-5-methylbenzyl)(methyl)amino)benzylidene)dimethylmalonate, dibenzylidene cyclopentanone, di(p- methoxybenzydene)cyclopentanone, di(p-nitrobenzydene) cyclopentanone, di(m-nitrobenzylidene)cyclopentanone, di(p-chlorobenzylidene)cyclopentanone, dibenzylidene cyclohexanone, di(p-methoxybenzydene)cyclohexanone, di(p-nitrobenzydene)cyclohexanone, di(m-nitrobenzylidene)cyclohexanone, di(p-chlorobenzylidene)cyclohexanone, 2,4,6-tris(diisobutyl-4'-aminobenzylidene malonate)-s-triazine, UV absorber (UV1990, manufactured by Eutec, maximum absorption wavelength: 384 nm), or other suitable benzylidene derivatives. The benzylidene-based derivative may be used alone or in combination.

Based on 100 parts by weight of the ethylenically-unsaturated monomer (B), the benzylidene-based derivative is 1.28 parts by weight to 2.35 parts by weight.

When the UV absorber (F) in the black resin composition includes benzylidene-based derivative, the cured film and the black filter formed by the black resin composition may have good resolution. When the black resin composition does not include the benzylidene-based derivative, the adhesion of the cured film and the black filter formed by the black resin composition is insufficient, and the cured film and the black filter cannot have good resolution, developability, and adhesion at the same time. Moreover, when the benzylidene-based derivative contained in the black resin composition falls within the above range, the cured film and the black filter formed by the black resin composition may have good resolution and the phenomenon that the resulting pattern is too small does not occur.

It should be mentioned that, the black resin composition of the present embodiment is used with a first resin including a structural unit having a fluorene ring and two or more ethylenically-polymerizable groups, and the UV absorber (F) including a benzylidene-based derivative to provide a black resin composition, a cured film, and a black filter having good resolution, developability, and adhesion at the same time.

Surfactant (G)

The surfactant (G) includes at least one selected from a group consisting of a fluorine surfactant (G-1), a siloxane surfactant (G-2), and a nonionic surfactant (G-3).

Specific examples of the fluorine surfactant (G-1) include Megaface F444, F477, F554, F556, F563, F575, RS-72-K (trade names; manufactured by DIC Co., Ltd.) or other suitable fluorine-based surfactants. The fluorine-based surfactant may be used alone or in combination.

Specific examples of the siloxane surfactant (G-2) include a polysiloxane-based surfactant. Specifically, the siloxane-based surfactant may include BYK-307, BYK-323, BYK-348 (trade names; manufactured by BYK Chemical Co., Ltd.), KP323, KP324, KP340, KP341 (trade names; Shin-Etsu Chemical Industry Co., Ltd.), or other suitable siloxane-based surfactants. The siloxane-based surfactant may be used alone or in combination.

Specific examples of the non-ionic surfactant (G-3) include polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid ester.

Based on 100 parts by weight of the ethylenically-unsaturated monomer (B), the surfactant (G) is 0.5 parts by weight to 5 parts by weight, preferably 1 part by weight to 3 parts by weight.

When the black resin composition includes the surfactant (G), the cured film and the black filter formed by the black resin composition may have good coating uniformity. When the content of the surfactant (G) included in the black resin composition falls within the above range, the cured film and the black filter formed by the black resin composition have better coating uniformity.

Additive (H)

Under the premise of not affecting the efficacy of the invention, the black resin composition may optionally further include an additive (H). The additive (H) is not particularly limited, and specifically, the additive (H) may include a stabilizing agent, an antioxidant, etc.

<Preparation Method of Black Resin Composition>

The preparation method of the black resin composition is not particularly limited, and a suitable method of mixing various components may be selected as needed. For example, the black coloring agent (A), the ethylenically-unsaturated monomer (B), the solvent (C), the resin (D), the photoinitiator (E), the UV absorber (F), and the surfactant (G) may be placed in a stirrer and stirred to be uniformly mixed into a solution state. If needed, the additive (H) may also be added, and after mixing uniformly, a liquid black resin composition is obtained.

<Cured Film>

The cured film is formed by the black resin composition above. In an embodiment, the visible light transmittance of the cured film is 5% to 50% when the thickness thereof is 0.2 μm, so that the cured film may be applied to a black filter and the black filter may have a specific light transmittance.

The cured film may be formed by coating the resin composition above on a substrate to form a coating film and performing pre-bake, exposure, development, and post-bake on the coating film. Specifically, after the black resin composition is coated on the substrate to form a coating film, pre-bake is performed at a temperature of 90° C. for 2 minutes. Next, the pre-baked coating film is exposed with an i-line exposure machine (wavelength: 365 nm) at 1400 J/m$^2$. Then, development is performed with a developing solution at a temperature of 23° C. for 84 seconds. Next, post-bake is performed at 220° C. for 5 minutes to form a cured film on the substrate.

The substrate may be a glass substrate, a silicon wafer substrate, or a plastic base material (such as a polysulfone (PES) board or a polycarbonate (PC) board), and the type thereof is not particularly limited.

The coating method is not particularly limited, but a spray coating method, a roll coating method, a spin coating method, or the like may be used, and in general, a spin coating method is widely used. In addition, a coating film is formed, and then, in some cases, residual solvent may be partially removed under reduced pressure.

The developing solution is not particularly limited, and a suitable developing solution may be selected as needed. Specifically, the developing solution may be tetramethyl ammonium hydroxide (TMAH), and the concentration thereof may be 0.3 wt %.

<Black Filter>

An exemplary embodiment of the invention provides a black filter, which is the above cured film. Moreover, the manufacturing method of the black filter may be the same as the above manufacturing method of the cured film, and is not repeated herein.

The cured film or the black filter film provided by an exemplary embodiment of the invention has a specific transmittance in the visible light region and may be applied to a CMOS image sensor (CIS), a solid-state imaging device, an integrated circuit (IC) semiconductor, a light-emitting diode, a liquid crystal display, and the like. Hereinafter, the invention is described in detail with reference to examples. The following examples are provided to describe the invention, and the scope of the invention includes the scope described in the following patent application and its substitutes and modifications, and is not limited to the scope of the examples.

Examples of Black Resin Composition and Cured Film

Example 1 to Example 5 and Comparative example 1 to Comparative example 2 of the black resin composition and the cured film are described below:

Example 1 a. Resin Composition 279 parts by weight of carbon black with a particle size of less than 80 nm, 519 parts by weight of titanium black with a particle size of less than 80 nm, 50 parts by weight of dipentaerythritol hexaacrylate, 50 parts by weight of DPHA-40H, 208 parts by weight of cardo resin (molecular weight 5300; manufactured by KISCO, Ltd.), 12.9 parts by weight of oxime ester-based photoinitiator (manufactured by Eutec), 1.88 parts by weight of UV absorber (UV1990, manufactured by Eutec, maximum absorption wavelength: 384 nm), and 2.3 parts by weight of a Megaface fluorine surfactant were added in a mixed solvent of 1030 parts by weight of propylene glycol ether and 195 parts by weight of glycol ether. After stirring uniformly with a stirrer, the black resin composition of Example 1 was obtained.

b. Cured Film

Each black resin composition prepared in the examples was coated on a substrate by a spin coating method (spin coater model: TEL-MK8, manufactured by Tokyo Electron Ltd., rotation speed: about 1800 rpm). Then, pre-bake was performed at a temperature of 90° C. for 2 minutes. Then, exposure was performed at 1400 J/m$^2$ using an i-line exposure machine (wavelength: 365 nm) (exposure machine model: FPA-5500 iZa, manufactured by Cannon) to form a semi-finished product. Next, development was performed at a temperature of 23° C. using TMAH having a concentration of 0.3 wt % as a developing solution for 84 seconds. Then, post-bake was performed at 220° C. for 5 minutes to obtain the cured films. The obtained cured films were evaluated by each of the following evaluation methods, and the results thereof are as shown in Table 1.

Example 2 to Example 5 and Comparative Example 1 to Comparative Example 2

The resin compositions of Example 2 to Example 5 and Comparative example 1 to Comparative example 2 were prepared using the same steps as Example 1, and the difference thereof is: the type and the usage amount of the components of the black resin compositions were changed (as shown in Table 1). The obtained black resin compositions were made into cured films and evaluated by each of the following evaluation methods, and the results thereof are as shown in Table 1.

TABLE 1

| Component (parts by weight) | | Example 1 | Example 2 | Example 3 | Example 4 | Example 5 | Comparative example 1 | Comparative example 2 |
|---|---|---|---|---|---|---|---|---|
| Black coloring agent (A) | Carbon black | 279 | 279 | 283 | 313 | 190 | 279 | 279 |
| | Titanium black | 519 | 519 | 526 | 582 | 354 | 519 | 519 |
| Sum of black coloring agent (A) | | 798 | 798 | 798 | 809 | 894 | 545 | 798 |
| Ethylenically-unsaturated monomer (B) | Dipentaerythritol hexaacrylate | 50 | 50 | 50 | 50 | 50 | 50 | 50 |
| | Polyfunctional polyurethane acrylate | 50 | 50 | 50 | 50 | 50 | 50 | 50 |
| Sum of ethylenically-unsaturated monomer (B) | | 100 | 100 | 100 | 100 | 100 | 100 | 100 |
| Solvent (C) | Propylene glycol-based ether | 1030 | 1030 | 1045 | 1155 | 703 | 1030 | 1030 |
| | Glycol ether | 195 | 195 | 198 | 218 | 133 | 195 | 195 |
| Sum of solvent (C) | | 1180 | 1225 | 1225 | 1242 | 1373 | 836 | 1225 |
| Resin (D) | Cardo resin | 208 | 207 | 210 | 245 | 110 | 0 | 209 |
| | Acrylic-based resin | 0 | 0 | 0 | 0 | 0 | 208 | 0 |
| Photoinitiator (E) | Oxime-based photoinitiator | 12.9 | 12.9 | 14.5 | 14.5 | 8.8 | 12.9 | 12.9 |
| UV absorber (F) | Benzylidene-based derivative | 1.88 | 2.35 | 1.90 | 2.11 | 1.28 | 1.88 | 0 |
| Surfactant (G) | Fluorine-based surfactant | 2.3 | 2.3 | 2.4 | 2.6 | 1.6 | 2.3 | 2.3 |
| Evaluation result | Resolution | ○ | ○ | ○ | ○ | ○ | × | △ |
| | Developability | ○ | ○ | ○ | ○ | ○ | × | ○ |
| | Adhesion | ○ | ○ | ○ | ○ | ○ | ○ | △ |
| | Light transmittance (%) | 13 ± 0.5 | 13 ± 0.5 | 13 ± 0.5 | 13 ± 0.5 | 13 ± 0.5 | 13 ± 0.5 | 13 ± 0.5 |

The trade names of the components/compounds in Table 1 are shown in Table 2.

TABLE 2

| Component/compound | Product related information |
|---|---|
| Carbon black | Trade name EC series, manufactured by Iridos |
| Titanium black | Trade name ET series, manufactured by Iridos |
| Polyfunctional polyurethane acrylate | Trade name DPHA-40H, manufactured by Nippon Kayaku Co., Ltd. |
| Propylene glycol-based ether | Propylene glycol monomethyl ether acetate (PGMEA) |
| Glycol ether | Diethylene glycol monomethyl ether acetate |
| Cardo resin | Trade name KBR series, KISCO Ltd. |
| Acrylic-based resin | An acrylic-based resin including a structural unit represented by formula (I-1), a structural unit represented by formula (I-2), and a structural unit represented by formula (I-3) (manufactured by Miwon Commercial Co.) |
| Oxime-based photoinitiator | Manufactured by Eutec |
| Benzylidene-based derivative | UV1990, manufactured by Eutec |
| Fluorine-based surfactant | Manufactured by DIC Co., Ltd. |

<Evaluation Methods> a. Resolution

The prepared cured films (thickness: 0.2 μm) were observed for the integrity of a dot pattern in an area with a critical size of 1.0 μm via a Critical Dimension Scanning Electron Microscope (CD-SEM) (Model: S-8840, manufactured by Hitachi) at a magnification of 45K to evaluate the resolution. A more complete outline of the pattern indicated the cured film had good resolution.

The evaluation criteria of resolution are as follows:
○: complete pattern outline;
Δ: outline of pattern slightly protruding or missing corner without affecting actual application;
x: incomplete pattern outline.

b. Developability

The prepared cured films (thickness: 0.2 um) were observed for residue in an unexposed area in an area with a critical size of 1 μm via a Critical Dimension Scanning Electron Microscope (CD-SEM) (Model: S-8840, manufactured by Hitachi) at a magnification of 35K to evaluate the developability. Less residue indicated the cured film had good developability.

The evaluation criteria of developability are as follows:
○: no residue;
Δ: slight residue without affecting practical application;
x: significant residue.

c. Adhesion

The minimum size of the pattern width of the pattern without peeling was observed under 50 times magnification of the prepared cured film (thickness: 0.2 μm) under an optical microscope (model: BH3-SIC6, manufactured by Olympus) to evaluate adhesion. The smaller the width of the pattern without peeling, the better the adhesion of the cured film.

The evaluation criteria of adhesion are as follows:
○: 1 μm≤pattern width<2 μm;
Δ: 2 μm≤pattern width<3 μm;
x: 3 μm≤pattern width.

d. Light Transmittance

The prepared cured films (thickness: 0.2 μm) were measured for transmittance at a wavelength of 380 nm to 780 nm at 13 points on the films via a colorimeter (model: MCPD-3000, manufactured by Otsuka Electronics Co., Ltd.), and the average value of the transmittance obtained was the light transmittance shown in Table 1.

<Evaluation Results>

It may be known from Table 1 that, when the black resin composition contains both a cardo resin and a benzylidene-based UV absorber (Examples 1 to 5), the cured film formed by the black resin composition has good resolution, developability, and adhesion at the same time and therefore may be applied to a black filter.

In comparison, when the black resin composition does not contain a cardo resin (Comparative example 1), the resolution and developability of the cured film formed by the black resin composition are poor; when the black resin composition does not contain a benzylidene-based UV absorber (Comparative example 2), the cured film formed by the black resin composition has insufficient adhesion, and may not have good resolution, developability, and adhesion at the same time.

Based on the above, when the black resin composition of the invention contains both cardo resin as the resin and benzylidene-based derivative as the UV absorber, the cured film or the black filter formed by the black resin composition has good resolution, developability, and adhesion at the same time, and has a suitable light transmittance under a certain thickness. Therefore, the black resin composition may be applied to a cured film or a black filter, thereby improving the performance of using a cured film or a black filter.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A black resin composition, comprising:
a black coloring agent (A);
an ethylenically-unsaturated monomer (B);
a solvent (C);
a resin (D);
a photoinitiator (E);
a UV absorber (F); and
a surfactant (G),
wherein the resin (D) comprises a first resin having a weight-average molecular weight of 2,000 to 20,000, and the first resin comprises a structural unit having a fluorene ring and two or more ethylenically-polymerizable groups is a structural unit represented by the following formula (1):

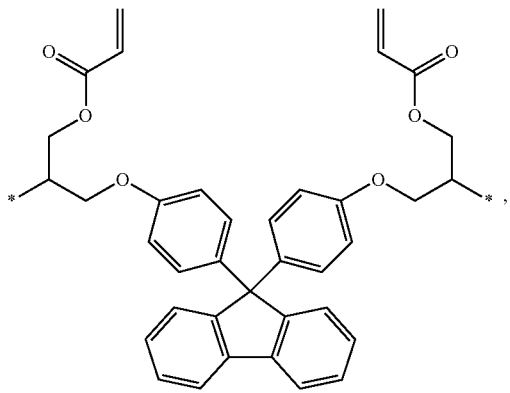

formula (1)

and the UV absorber (F) comprises a benzylidene-based derivative in amount of 1.28 parts by weight to 2.35 parts by weight based on 100 parts by weight of the ethylenically-unsaturated monomer (B), and wherein a cured film or a black filter formed by the black resin composition has a visible light transmittance of 5% to 50% at a thickness of 0.2 μm.

2. The black resin composition of claim 1, wherein the black coloring agent (A) comprises a carbon black (A-1) and a titanium black (A-2), and a particle size of the carbon black (A-1) and the titanium black (A-2) is less than 80 nm.

3. The black resin composition of claim 1, wherein the ethylenically-unsaturated monomer (B) is a monomer having four or more (meth)acryloyl groups.

4. The black resin composition of claim 1, wherein the solvent (C) comprises a propylene glycol-based ether solvent (C-1), and the propylene glycol-based ether solvent (C-1) is at least one selected from a group consisting of propylene glycol monomethyl ether, propylene glycol monomethyl ether acetate, dipropylene glycol monomethyl ether acetate, propylene glycol monoethyl ether, and propylene glycol monopropyl ether.

5. The black resin composition of claim 1, wherein the photoinitiator (E) comprises an oxime ester-based photoinitiator.

6. The black resin composition of claim 5, wherein based on 100 parts by weight of the ethylenically-unsaturated monomer (B), the oxime ester-based photoinitiator is 1 part by weight to 50 parts by weight.

7. The black resin composition of claim 1, wherein the surfactant (G) comprises at least one selected from a group consisting of a fluorine surfactant (G-1), a siloxane surfactant (G-2), and a nonionic surfactant (G-3).

* * * * *